United States Patent [19]

Wieland et al.

[11] 3,878,895

[45] Apr. 22, 1975

[54] CEMENT PREFLUSH METHOD

[75] Inventors: Denton R. Wieland; Bobby L. Woods, both of Midland, Tex.

[73] Assignee: The Dow Chemical Company, Midland, Mich.

[22] Filed: Apr. 11, 1974

[21] Appl. No.: 460,008

[52] U.S. Cl................................ 166/294; 166/291
[51] Int. Cl............................................. E21b 33/14
[58] Field of Search ........... 166/294, 293, 292, 291, 166/283, 305 R; 175/65, 72

[56] References Cited
UNITED STATES PATENTS

| | | | |
|---|---|---|---|
| 3,153,450 | 10/1964 | Foster et al. | 166/283 |
| 3,382,924 | 5/1968 | Veley et al. | 166/305 R |
| 3,448,800 | 6/1969 | Parker et al. | 166/294 |
| 3,465,825 | 9/1969 | Hook et al. | 166/293 |
| 3,467,193 | 9/1969 | Messenger | 166/294 X |
| 3,491,049 | 1/1970 | Gibson et al. | 166/293 X |
| 3,511,314 | 5/1970 | Scott et al. | 166/294 X |
| 3,611,733 | 10/1971 | Eilers et al. | 166/294 X |
| 3,613,790 | 10/1971 | Stout et al. | 166/294 |

*Primary Examiner*—Stephen J. Novosad
*Attorney, Agent, or Firm*—Bruce M. Kanuch; Stephen R. Wright

[57] ABSTRACT

A novel cement preflush method to be used prior to cementing a pipe into a well bore located in a subterranean formation comprises injecting into the bore hole and in contact with the formation an aqueous mixture of guar gum, potassium chloride, a turbulence inducer, polyethyleneimine and powdered limestone.

11 Claims, No Drawings

CEMENT PREFLUSH METHOD

BACKGROUND OF THE INVENTION

The present invention pertains to control of carrier fluid loss in a well bore. More specifically, the present invention is a new method of shutting off the exposed interior surfaces of a well bore formation to the flow of the filtrate in which well cementing compositions are suspended.

Loss of cement filtrate within a well bore formation is a well known problem. A well cement generally comprises an aqueous suspension of cementitious materials, and upon injection down the bore hole, a portion of the filtrate (basically $H_2O$) seeps into the formation, which is generally permeable to water. This causes the undesirable result that the cementitious solids are not conveyed to their desired destination in the formation, but rather are deposited out along the way.

One suggested solution to this problem involves the addition of plug-forming materials to the cement composition itself. However, this approach is unsatisfactory in: (1) that the cement fails to completely fill all voids in the formation, allowing water to escape around the cement "plugs," and (2) that the cement, once hardened, cannot be chemically removed from the pores it is plugging requiring undesired refracturing of the formation after drilling to permit petroleum flow.

Accordingly, there is a need for a water shut off process wherein the water permeable pores in a well bore formation are completely plugged in a manner nondeleterious to later petroleum flow therethrough.

SUMMARY OF THE INVENTION

The desired objectives of the invention are obtained by injecting into the well bore an aqueous mixture of guar gum, potassium chloride, a turbulence inducer, polyethyleneimine and powered limestone, e.g., in an aqueous slurry. The result is a substantially waterproof formation. The present composition is soluble in acid and may be removed when desired by contacting the formation with an acid solution, such as hydrochloric acid or other acids and acid mixtures conventionally used in cleaning and opening well bores.

The teachings of all the patents referred to herein are specifically incorporated herein by reference.

DETAILED DESCRIPTION OF THE INVENTION

In the practice of the present invention essentially any well bore located in a subterranean formation susceptible to loss of an aqueous carrier fluid may be treated. Those formations which have been drilled employing a gaseous drilling fluid or which are especially susceptible to being damaged by a cement filtrate are particularly beneficially treated by the method of the present invention. The present seal does not consolidate into an unremovable, hard solid mass, but rather forms an acid soluble deposit which can be later removed.

According to the present invention, an example of a cement preflush composition coming within the scope of the invention is formed by mixing, e.g., in a transporter, 860 gallons fresh water, 25 pounds guar gum, 200 pounds potassium chloride, 20 gallons polyethyleneimine, and 10 pounds of a turbulence inducer consisting of a lithium containing salt of the condensation product of mononaphthalene sulfonic acid and formaldehyde. Generally the batch of preflush composition is formed in a volume of about ⅓ to ½ of the amount of cement slurry later to be injected into the well bore to assure the entire interior surface of the well bore is shut off to cement filtrate loss.

After the above formulation is formed, it begins to gel into a viscous aqueous mixture. To this mixture is added 2000 pounds of powdered limestone, forming a gelled slurry. This gelled slurry is then injected into the well bore to coat the exposed interior surfaces of the formation prior to introducing the cement composition.

The guar gum is used in the present invention as a gelling agent, permitting the powdered limestone to remain in suspension in the formulation. It also is beneficial in minimizing the fluid loss of the instant formulation into the formation. It is utilized in its conventionally available form, i.e., the water soluble portion (guaran) of which comprises about 85% and contains about 35% galactose, 60% mamose, and 5–7% protein; see Rose, Arthur and Elizabeth, *The Condensed Chemical Dictionary*, 7th Ed., Reinhold Publishing Co., New York, 1966, page 462. Reference may be had to U.S. Pat. No. 3,153,450 for other materials useful as gelling agents.

The time required for the gelling of the aqueous slurry varies according to the temperature and the nature of the gelling agent employed. That is, various materials gel at various rates; guar gum gels relatively rapidly. A fast gelling rate, though generally preferred is not a prerequisite to the utilization of the present composition.

The potassium chloride helps to minimize swelling of clayey material located in the formation caused by water contact therewith. Although KCl is preferred, in its place certain other clay stabilizers such as other inorganic salts such as NaCl, $CaCl_2$, or a zirconium oxychloride solution (U.S. Pat. No. 3,382,924) may also be employed.

In the utilization of the latter two materials, care should be taken that a cement slurry not be permitted to contact the preflush formulation prior to its emplacement, since these materials accelerate the setting of the cement.

One turbulence inducer which can be employed is the lithium or lithium-sodium salt of the condensation product of mononaphthalene sulfonic acid and formaldehyde. This salt and its method of preparation are taught in U.S. Pat. No. 3,465,825, Column 3, line 70 through Column 4, line 25, the teachings of which are specifically incorporated herein by reference. Another turbulence inducer which can be employed is a bisulfite modified phenol-formaldehyde condensation product. This material and its method of preparation are taught in U.S. Pat. No. 3,465,824, the teachings of which are specifically incorporated herein by reference.

Polyethyleneimine helps to prevent loss of the fluid whih carries the limestone into the formation. Polyethyleneimine polymers with molecular weights in the range of about 40,000–60,000 are most useful for this purpose. In the present example an aqueous solution of polyethyleneimine of approximately 33% polyethyleneimine by weight was formed and then mixed with the other components to form the cement preflush composition. Reference may be had to U.S. Pat. Nos. 3,465,825 and 3,491,049 for equivalent materials which may be employed.

The limestone is utilized in conventional particulate form, but preferably is ground to a size of 100 mesh or less. Upon completion of the treatment of the present method, a limestone coating will be emplaced in the pores of the formation, shutting off water flow and being susceptible to easy subsequent removal by an aqueous hydrochloric acid solution. In the present composition, the limestone solids constituted 2 pounds per gallon of the preflush slurry formed. A useful range would be about 1 to about 5 pounds per gallon. Too dilute a slurry might require inefficiently large amounts of liquid to inject the desired amounts of solids. Too concentrated a slurry might result in immobilization of the slurry.

Equivalent particulate materials for limestone include acid soluble solids, such as dolomite (calcium-magnesium carbonate), oyster shells, and marble dust. Representative size distributions are taught in U.S. Pat. No. 3,153,450. In the present composition, the preferred range of particle sizes is from about 1.5 to about 6 microns. Although the material used should be of mesh size 100 or smaller, particles of mesh size of 325 or smaller are preferred.

What is claimed is:

1. A method of emplacing a hydraulic cement slurry into a bore hole penetrating a subterranean formation which is permeable to the flow of liquid contained in said hydraulic cement slurry which comprises:
  a. prior to introducing said cement slurry into said bore hole contacting the exposed face of said permeable formation with a fluid loss composition which comprises an aqueous slurry of a clay stabilizer; a gelling agent; an acid soluble particulate material of about 100 mesh or smaller, in an amount ranging from about 1 to about 5 pounds per gallon of said aqueous slurry; a turbulence inducer; polyethyleneimine, and sufficient water to form a pumpable slurry; said gelling agent being employed in an amount sufficient to suspend said particulate solids in said slurry, and
  b. introducing said cement slurry into said bore hole in contact with said permeable formation.

2. The method of claim 1 wherein the aqueous slurry contains as the acid soluble particulate material limestone.

3. The method of claim 1 wherein the amount of aqueous slurry employed ranges from about ⅛ to about ½ the volume of cement slurry to be placed in said bore hole.

4. The method of claim 1 wherein the turbulence inducer is the lithium or lithium sodium salt of the condensation product of mononaphthalene sulfonic acid and formaldehyde or a bisulfide modified phenol-formaldehyde condensation product.

5. The method of claim 1 wherein the clay stabilizer is an inorganic salt.

6. The method of claim 1 wherein the clay stabilizer is potassium chloride.

7. The method of claim 1 wherein the polyethyleneimine has a molecular weight ranging from about 40,000 to about 60,000.

8. The method of claim 1 wherein the gelling agent is guar gum.

9. The method of claim 1 wherein the aqueous slurry comprises: guar gum; particulate limestone; a lithium or lithium-sodium salt of the condensation product of mononaphthalene sulfonic acid and formaldehyde, potassium chloride; and polyethyleneimine having a molecular weight ranging from about 40,000 to 60,000, and sufficient water to form a pumpable slurry.

10. The method of claim 9 wherein the aqueous slurry comprises: 860 gallons of water; 25 pounds of guar gum; 200 pounds of potassium chloride; 10 pounds of the lithium salt of the condensation product of mononaphthalene sulfonic acid and formaldehyde; 20 gallons of an aqueous solution containing about 33 percent by weight of polyethyleneimine having a molecular weight ranging from about 40,000 to 60,000; and 2000 pounds of particulate limestone.

11. The method of claim 10 wherein the formation is contacted with from about ⅛ to about ½ the volume of said aqueous slurry as the hydraulic cement slurry to be emplaced in the bore hole.

* * * * *